United States Patent
Viseur et al.

(10) Patent No.: US 8,324,536 B2
(45) Date of Patent: Dec. 4, 2012

(54) DEVICE FOR IGNITING AN ALUMINO-THERMAL COMPOSITION, CRUCIBLE CONTAINING SAME AND RELATED METHODS

(75) Inventors: Francis Viseur, Herin (FR); Jean-Jacques Thuru, Saint-Amand-les-Eaux (FR); Lionel Winiar, Ronchin (FR)

(73) Assignee: Railtech International (FR)

( * ) Notice: Subject to any disclaimer, the term of this patent is extended or adjusted under 35 U.S.C. 154(b) by 620 days.

(21) Appl. No.: 12/529,964

(22) PCT Filed: Feb. 18, 2008

(86) PCT No.: PCT/EP2008/051933
§ 371 (c)(1),
(2), (4) Date: Sep. 4, 2009

(87) PCT Pub. No.: WO2008/113653
PCT Pub. Date: Sep. 25, 2008

(65) Prior Publication Data
US 2010/0163607 A1    Jul. 1, 2010

(30) Foreign Application Priority Data
Mar. 6, 2007 (FR) ...................... 07 53668

(51) Int. Cl.
*F23Q 7/22* (2006.01)
*B23K 23/00* (2006.01)
(52) U.S. Cl. ....................................... 219/270

(58) Field of Classification Search ................... 219/270
See application file for complete search history.

(56) References Cited

U.S. PATENT DOCUMENTS

| 1,562,137 | A |   | 11/1925 | Turner |
| 3,456,333 | A | * | 7/1969 | Dohse et al. .................. 228/175 |
| 3,562,590 | A | * | 2/1971 | Mitts et al. .................... 219/267 |
| 3,942,579 | A | * | 3/1976 | Guntermann .................... 164/54 |
| 5,145,106 | A |   | 9/1992 | Moore et al. |
| 5,377,959 | A | * | 1/1995 | Besch et al. .................. 266/167 |
| 2003/0116693 | A1 | * | 6/2003 | Hantusch et al. ............... 249/86 |

FOREIGN PATENT DOCUMENTS

FR    2893871 A1    6/2007

OTHER PUBLICATIONS

International Search Report, PCT/EP2008/051933, dated May 2, 2008.

* cited by examiner

*Primary Examiner* — Stephen W Smoot
(74) *Attorney, Agent, or Firm* — Lerner, David, Littenberg, Krumholz & Mentlik, LLP (57) ABSTRACT

The invention relates to a device for igniting an aluminothermic composition, characterized in that it comprises an electric resistor for connecting two electrodes and to be supplied by an electric current source of in order to generate heat by a Joule effect, said electric resistor being exposed to a medium comprising oxygen and carbon so that the temperature rise of the medium by the resistor results in the formation of carbon monoxide, and then in an exothermal reaction of the latter with oxygen, thus generating a flame capable of igniting of the aluminothermic composition.

20 Claims, 8 Drawing Sheets

DEVICE FOR IGNITING AN ALUMINO-THERMAL COMPOSITION, CRUCIBLE CONTAINING SAME AND RELATED METHODS

CROSS REFERENCE TO RELATED APPLICATIONS

The present application is a national phase entry under 35 U.S.C. §371 of International Application No. PCT/EP2008/051933, filed Feb. 18, 2008, published in French, which claims benefit of French Patent Application No. 0753668, filed Mar. 6, 2007. The disclosures of all of said applications are incorporated by reference herein.

The present invention relates to a method for igniting an aluminothermic composition and to an associated device, and more particularly to a method and a device of the type in which an electric resistor connecting two electrodes is placed in immediate proximity to the composition and this resistor is supplied with an electric current in order to cause release of heat by the Joule effect from the latter.

Such a method and such a device are well-known per se, in an embodiment in which the electric resistor is coated with a pyrotechnic ignition composition and thus coated, is immersed in the aluminothermic composition to be ignited. This pyrotechnic ignition composition is composed and dosed in such a way that under the effect of the release of heat caused by the Joule effect in the electric resistor when it is supplied with electric current, it causes sufficient heat release so as to cause ignition of the aluminothermic charge, which the simple heat release via the Joule effect would not have been able to cause.

Thus, U.S. Pat. No. 1,562,137 describes such a method, applied to the ignition of an aluminothermic composition for use as a "thermal mine", intended to break ice in water supplies of hydraulic installations, but other applications have been proposed, in particular in the field of aluminothermic welding of railway rails.

This method as thereby applied in a known way, proves to be particularly dangerous insofar that as soon as it has entered into reaction, even by accident, the pyrotechnic composition self-sustains the reaction without any practical possibility of stopping it and thus untimely causes ignition of the aluminothermic composition and the particularly large heat release which accompanies it, thereby having the personnel present onsite and the installations run a particularly high risk, regardless of the contemplated application.

The Applicant moreover attempted to develop a method for igniting an aluminothermic composition of the type indicated in the preamble, characterized in that at least one of the electrodes is made in a material having a first determined melting temperature above a second determined temperature for igniting the aluminothermic composition, that the release of heat is caused by the Joule effect in the presence of carbon and of oxygen, in an initially sufficiently confined space in order to reach a third temperature above said first temperature therein and such that the result is generation of ionized carbon monoxide, so as to cause localized ionization melting of said material, and that the supply of both electrodes with electric current is then maintained while sustaining the generation of ionized carbon monoxide and the passing of current between them in order to thereby continue the localized ionization melting of the material, at least for a sufficient time, so as to thus produce an ionized bead of said melting material having sufficient mass and temperature for causing, by heat exchange with said aluminothermic composition and by ionic excitation thereof, ignition of the latter.

Such a method however has the drawback of not allowing sufficiently predictable and reliable ignition of the aluminothermic composition. Moreover, the ionized bead which primes the composition, runs the risk of producing a short-circuit because it forms a physical contact between the electrodes.

An object of the present invention is to find a remedy to the drawbacks of the prior art.

According to a first aspect, a device for igniting an aluminothermic composition is proposed for this purpose, characterized in that it comprises an electric resistor connecting two electrodes and intended to be powered with an electric current source in order to cause release of heat by the Joule effect, said electric resistor being exposed to a medium comprising oxygen and carbon, so that the rise in temperature of the medium by the resistor causes the formation of carbon monoxide and then an exothermic reaction of the latter with oxygen, causing the occurrence of a flame capable of causing ignition of the aluminothermic composition.

Tests conducted by the Applicant with such a device have shown that establishment of the current caused an instantaneous reaction of the device.

Certain preferred but non-limiting aspects are the following:
the resistor comprises carbon,
formation of carbon monoxide is carried out at least partly from the carbon comprised in the resistor,
the resistor comprises an insulating support bearing carbon fibers,
the carbon fibers are woven,
the carbon fibers are applied by pressure against the electrodes,
the support bears carbon fibers around it and is forcibly inserted between the electrodes,
the support is elastically compressible,
the carbon fibers are conformed with a generally U-shaped section around the support,
oxygen is from the ambient air,
it includes a passage for providing ambient air,
the passage opens out in the vicinity of the resistor,
an element forming a barrier to the solids is provided around the resistor,
said barrier-forming element is formed by said support, the latter comprising an insulating adhesive tape applied against the electrodes,
it further comprises an external essentially rigid structure ensuring that the adhesive tape is maintained in place,
the level of the aluminothermic composition is located under the lower end of the electrodes and at a distance from the latter,
the level of the aluminothermic composition is located above the lower end of the electrodes,
the lower end of the electrodes is comprised in the barrier-forming element, so that the electrodes are not in direct contact with the aluminothermic composition,
the electrodes are in steel,
the resistor is a preformed capsule,
it includes a sealed casing containing a priming aluminothermic composition dose and mounted on a base in which the electrodes are mounted,
the casing is made in a material for which the melting point is substantially less than the temperature reached by the aluminothermic reaction of the priming dose,
the casing is made in a single piece in aluminium or aluminium alloy,
the passage is formed in a wall of the casing, the level of the aluminothermic composition in the casing is located under the lower end of the electrodes and at a distance from the latter, the level of the aluminothermic composition in the casing is located under the passage, the level of the aluminothermic composition in the casing is located above the lower end of the electrodes, the lower end of the electrodes is contained in the barrier-forming element, so that the electrodes are not in direct contact with the aluminothermic composition.

According to a second aspect of the invention, a method for igniting an aluminothermic composition is proposed, comprising the steps consisting of placing in proximity to the composition, a device as defined above, and of supplying electric current to the resistor of this device, the flame generated at the resistor directly triggering off the aluminothermic reaction.

According to a third aspect of the invention, a method for igniting a main aluminothermic composition is proposed, comprising the steps consisting of placing in proximity to the composition a device as defined above, and of supplying electric current to the resistor of this device, the flame generated at the resistor triggering off an aluminothermic reaction at the priming dose, itself followed by at least partial melting of the casing letting incandescent molten metal from said reaction propagate towards the main aluminothermic composition.

According to a fourth aspect of the invention, a method for aluminothermic welding of profiles such as railway rails, is proposed, in which a dose of aluminothermic composition is placed in a crucible surmounting a mold defining with two facing profile ends a molding cavity, characterized in that the aluminothermic reaction is triggered off in said dose by means of one of the previous methods.

According to a fifth aspect of the invention, a method for making an ignition device is proposed, characterized in that it comprises the steps consisting of cutting out the insulating support from an extruded insulating part, of applying carbon fibers around the support and of force-fitting the support provided with carbon fibers between the electrodes.

According to a sixth aspect of the invention, a method for making an ignition device is proposed, characterized in that it comprises the steps consisting of cutting out the insulating support from an extruded insulating part around which carbon fibers are prefixed over the whole of its length and of force-fitting the support provided with carbon fibers between the electrodes.

Certain preferred but non-limiting aspects of the two latter methods are the following:

the insulating part is in silicone, it comprises an additional step for applying on the electrodes a force tending to bring them closer together.

According to a seventh aspect, the invention proposes a crucible assembly for an aluminothermic reaction, capable of being adjusted above a mold for welding profiles such as railway rails, characterized in that it comprises the ignition device.

Certain preferred but non-limiting aspects are the following it comprises a lid, and the device is placed in an aperture passing through the lid, the crucible comprises in a sidewall a suitable aperture for receiving the ignition device.

The method and the device according to the invention may have many applications, in particular that of aluminothermic welding of profiles such as railway rails, an application in which the conditions for conveying and handling the different devices do not allow strict safety instructions to be easily observed, which in particular requires that the ignition devices exclude any untimely ignition of aluminothermic welding charges.

In connection with such an application, provision may be made for housing the aluminothermic welding charge in a crucible. Provision may then be made for burying more or less the device according to the invention into the aluminothermic welding charge.

Regardless of how the device according to the invention is thus positioned relatively to the aluminothermic welding charge housed in the crucible, it may appear in a form independent of the latter, so as to be placed therein only when welding has to be carried out, and this whether the crucible is intended to be reused after welding or destroyed after the latter.

However, provision may also be made for integrating the device according to the invention, itself intended for single use, to the crucible or to a portion of the crucible assembly.

For this purpose, it is provided that an ignition device according to the invention includes means for firmly integrating electrodes to a wall of a crucible assembly for aluminothermic welding, or means for firmly integrating the device to a wall of a crucible assembly for aluminothermic welding, respectively.

By "crucible assembly" is meant here not only an actual crucible, i.e. a container containing the aluminothermic welding charge, but also any accessory of this crucible, for example a lid possibly added onto an upper aperture of the crucible in order to limit or avoid any projection of incandescent particles, and filter any gas emission during this reaction.

Other aspects, objects and advantages of the present invention will become better apparent upon reading through the following detailed description of preferred embodiments of the latter, given as a non-limiting example, and made with reference to the appended drawings, wherein:

FIG. 5 shows a partial view of the ignition device of FIG. 3a, as a sectional view through the transverse plane V-V in FIG. 3a.

First of all with reference to FIGS. 1-5, two non-limiting examples of an ignition device 1 according to the invention are illustrated, including, in order to cause ignition of an aluminothermic weld charge 2 contained in a crucible assembly 3, a suitable dose 4 of an aluminothermic composition, with a considerably reduced volume relatively to the one of the charge 2.

The aluminothermic composition forming the dose 4 and the aluminothermic weld charge 2 preferably exist in the granular state, with a concern for safety against spontaneous starting of the aluminothermic reaction. The nature of the aluminothermic composition forming the dose 4 may be the same or may slightly differ from that of the aluminothermic welding charge 2 provided that this cannot result in any pollution of the latter.

The device 1 thus includes, in order to house the aluminothermic composition dose 4, a sealed casing 6, in a material capable of melting or being destroyed otherwise by heating it to a temperature of the order of the one reached by the aluminothermic composition forming the dose 4 without any risk of causing pollution of the aluminothermic charge 2. The casing 6 may thus advantageously be made in a single piece in aluminium or aluminium alloy.

The casing 6 is open at the upper end of the tubular wall 7 which forms it, but its aperture 11 is sealably closed by a plug (or base) 10 made in a material which both forms an electric insulator and withstands for a sufficiently long time the rise in temperature to which it is subject during operation of the device 1. The base 10 may for example be made in thermosetting or even thermoplastic synthetic material, such as a polyimide like PA6 filled with glass fibers.

The base 10 is firmly attached to the casing 6 by coaxial engagement into the aperture 11, at the end of the wall 7, and by crimping 13 in the wall 7.

Like the casing 6, the base 10 in the illustrated example has a general axisymmetrical shape around the axis 8.

Inside the base 10, for example two essentially longitudinal electrodes 20, 21 are partly housed and firmly retained for example by overmolding. The base 10 maintains electric insulation between them.

Both electrodes 20 and 21 are made in a material having a melting temperature above the priming temperature of the aluminothermic composition 4 and below the temperature of the ignition flame.

Thus, for a priming temperature of the composition 4 of the order of 1,340° C. the electrodes 20 and 21 are advantageously made in a material having a melting temperature at least equal to 1,600° C., for example in soft steel.

Each electrode 20, 21 thereby made in steel, may optionally be coated with an electrically conducting sheath and resistant to oxidization which protects it from corrosion until the use of the device.

The electrodes 20 and 21 each have for example the shape of a full rod with constant circular section, and each include two rectilinear sections which are longitudinally in succession. The first section is parallel to the axis 8 and partly protrudes from the base 10. The second section gradually moves away from the axis 8 relatively to the upper face of the base 10, as far as a respective free end 22, 23.

These free ends 22, 23 according to one embodiment are capable of being connected to a respective electric power supply conductor by interlocking, and of being separated for example by simply pulling on the corresponding conductor.

These conductors are themselves connectable to a controlled electric current supply device 74 providing high intensity, and to a switch 75 allowing the conductors to be supplied with electric current and allowing this supply to be maintained as long as intended.

The power supply device 74 preferably comprises a 12 volt battery with fast discharge, so as to be able to provide the requested current very rapidly.

A passage 30 opening out on the outside is provided in the device 1 so that air may enter the closed space defined by the base 10 and the casing 6. This passage 30 allows oxygen to be supplied, required for operating the device, as this will be seen in detail in the following.

Figure 2:
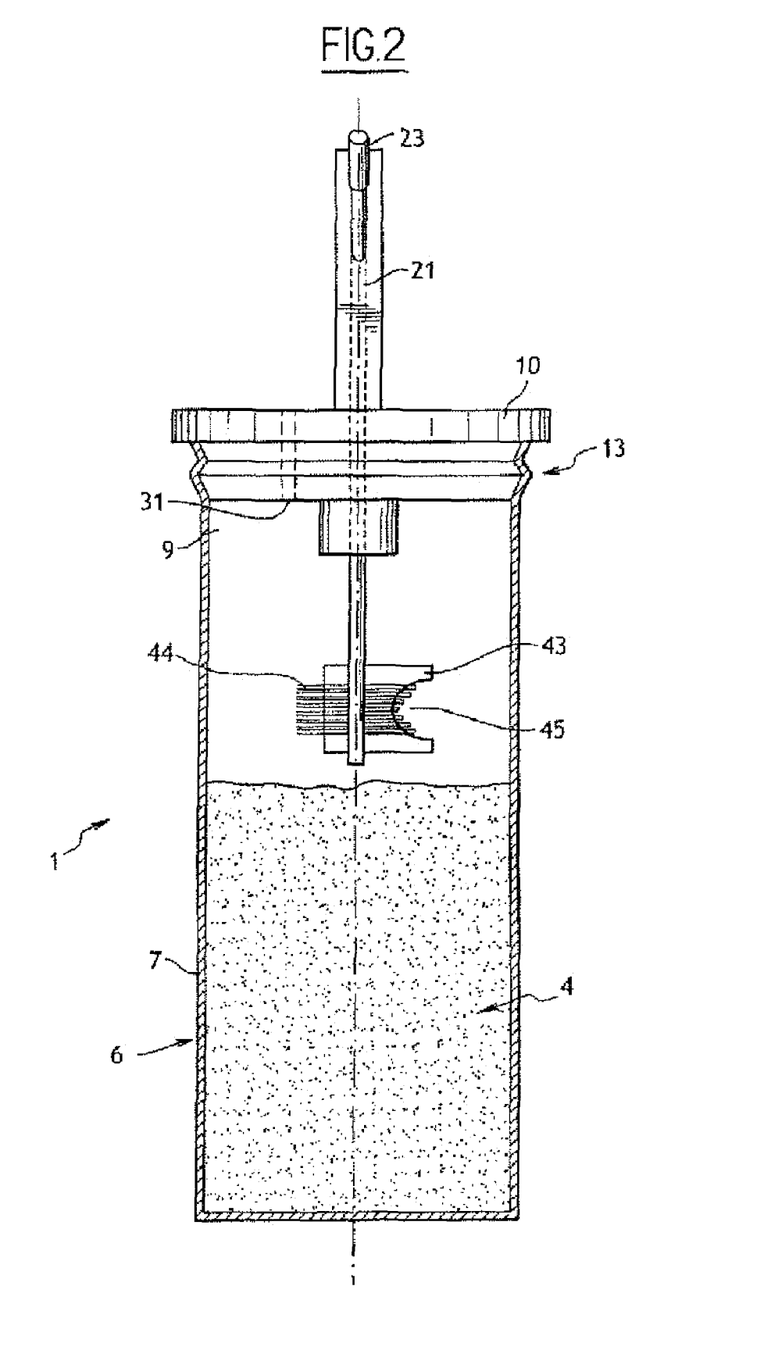
FIG. 2 is a side view of the ignition device of FIG. 1.
Figure 3A:
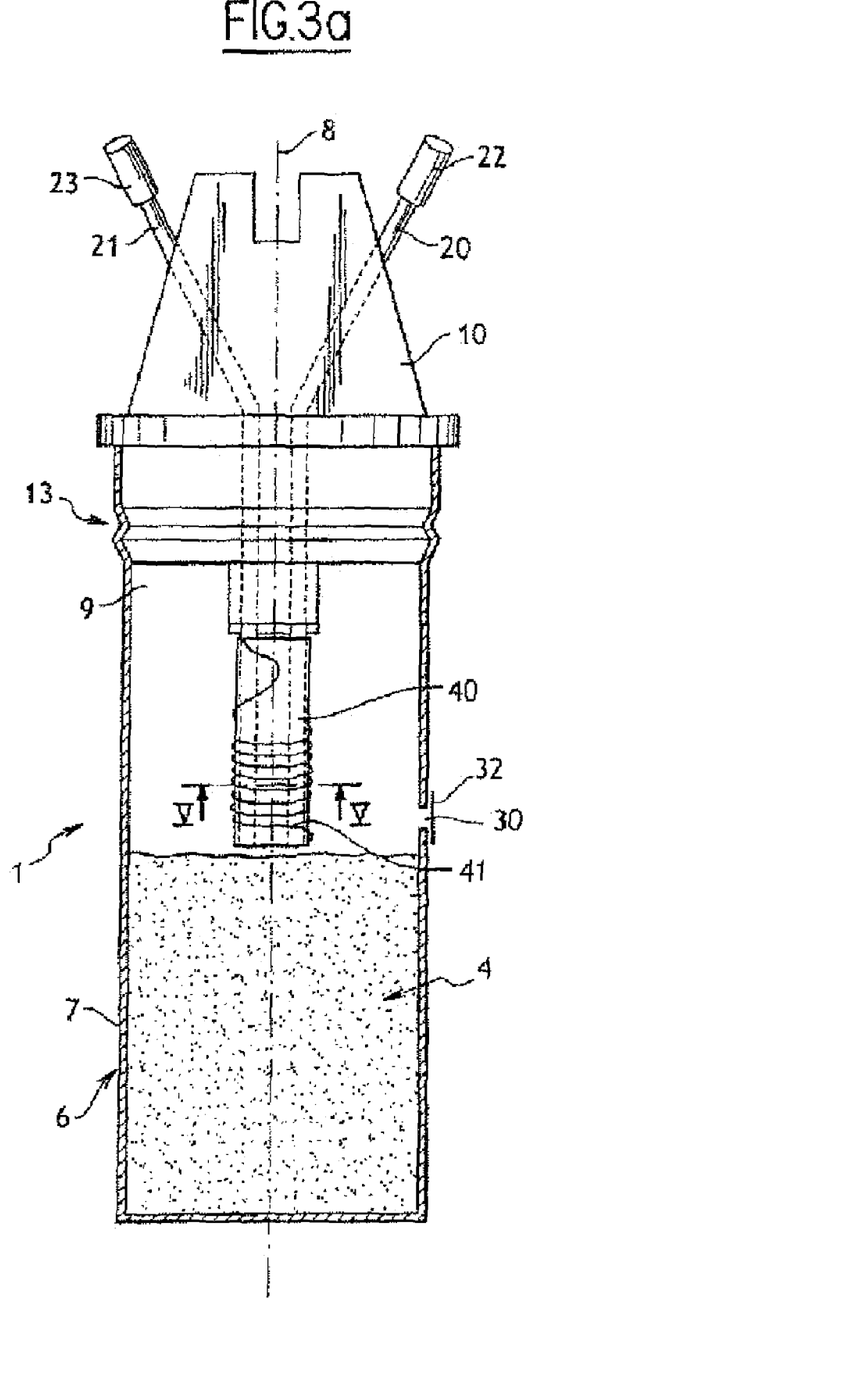
FIG. 3a shows a view of an ignition device according to the invention, partly as a sectional view through a median longitudinal plane of symmetry, including an axis of symmetry of the device, and partly as an elevational view, according to a second embodiment.
Figure 3B:
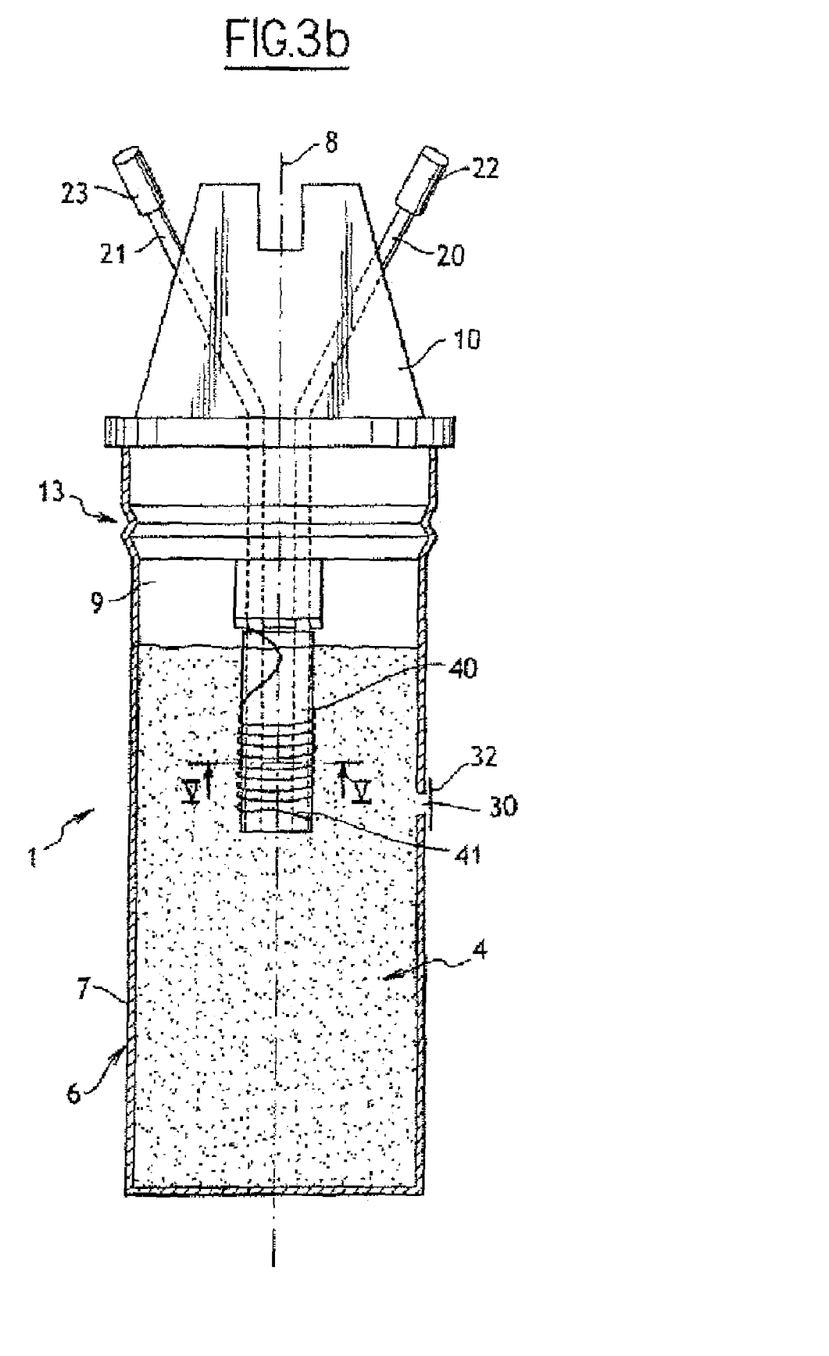
FIG. 3b shows a view of an ignition device according to the invention, partly as a sectional view through a median longitudinal plane of symmetry, including an axis of symmetry of the device, and partly as an elevational view, according to an alternative of the second embodiment.

The passage 30 may for example be formed in the base 10, as a channel 31 communicating with the inner space 9 of the casing 6, as illustrated in FIG. 2.

Figure 1:
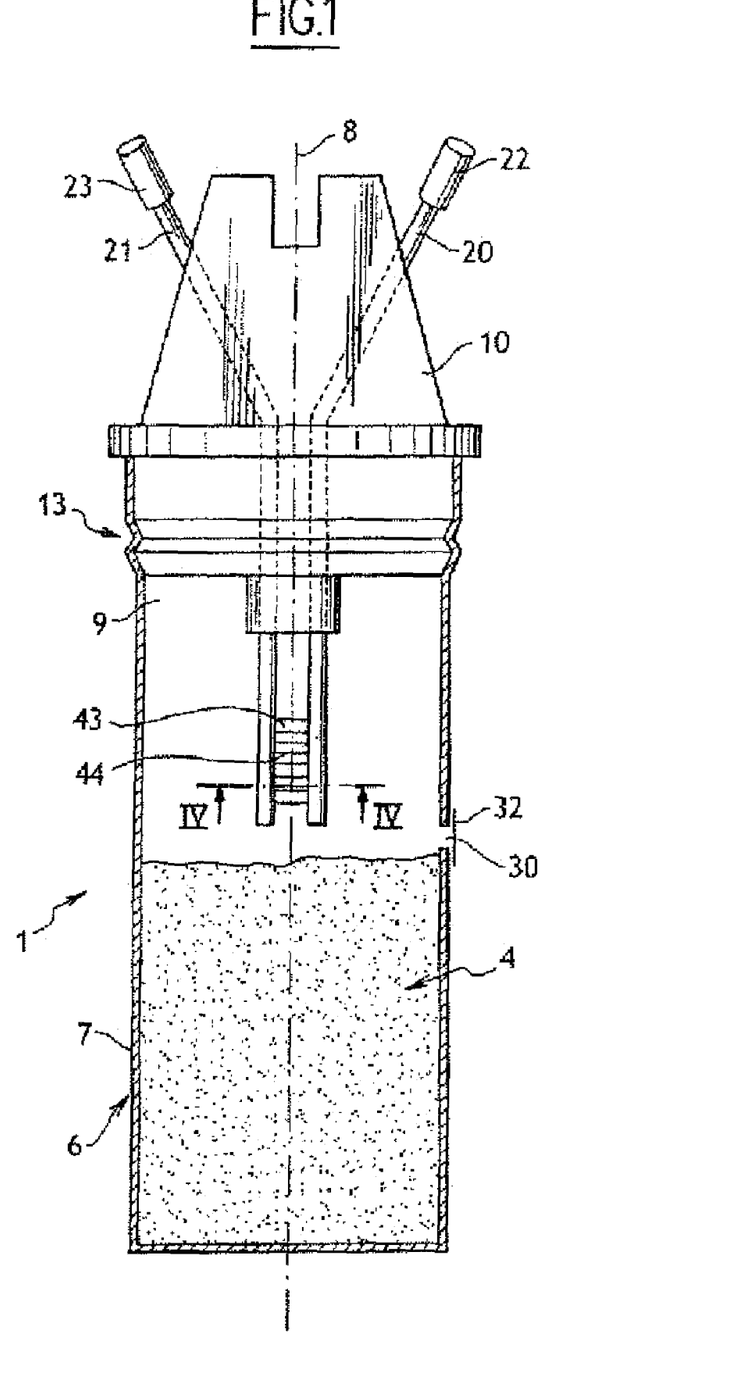
FIG. 1 shows a view of an ignition device according to the invention, partly as a sectional view through a median longitudinal plane of symmetry, including an axis of symmetry of the device, and partly as an elevational view, according to a first embodiment.

Alternatively, it may also be directly pierced into the casing 6, at the space 9, as illustrated in FIG. 3, or even at the charge 4, as illustrated in FIG. 1. A temporary protection 32 then covers the passage 30 during storage of the device 1. Upon using the device, it is then sufficient to remove this protection before igniting the charge. As a non-limiting example, this may be an adhesive protection such as a label, which at the same time may bear an expiry date.

The device further comprises an electric resistor 40 mounted between both electrodes 20, 21.

This resistor which may be made in different forms, contains carbon in order to allow the formation of carbon monoxide required for igniting a flame as this will be seen.

Further, the resistor 40 is mounted on the electrodes 20, 21 so that a firm physical contact is ensured between them so that the current may be properly established in the resistor, while withstanding the rise in temperature during a sufficiently long time in order to end up with formation of a flame, as this will also be seen in detail later on.

It will be noted that the resistor 40 is directly exposed to the inner space defined by the casing 6 and the base 10.

In a preferential embodiment (illustrated in FIGS. 1, 2, 3a), the level of the aluminothermic composition 4 in the casing 6 is located under the lower end of the electrodes 20, 21, and at a distance from the latter, more particularly at a distance of the order of a few millimeters. Thus, as no contact upon starting the reaction can occur between the electrodes 21, 22 and the composition 4, any risk of melting the electrodes 20, 21 or short-circuiting them may be avoided.

Moreover, in order to prevent any risk of leaking of the composition through the passage 30, if it is made in the casing 6, upon removing the protection 32, said passage 30 may advantageously be positioned slightly above the upper surface of the aluminothermic composition 4, at the lower end of the electrodes 20, 21.

According to another embodiment (illustrated in FIG. 3b) the level of the aluminothermic composition in the casing 6 is located above the lower end of the electrodes 20, 21. In order that they are not embedded in the aluminothermic composition 4, which would risk causing a short-circuit between the composition 4 and the electrodes 20, 21 on the one hand, and partial melting of the electrodes 20, 21 upon starting of the reaction on the other hand, a barrier-forming element is placed at said lower ends of the electrodes. This element may for example be formed by the resistor, or any other solid element placed around the resistor 40 with which any contact between the electrodes 20, 21 and the composition 4 may be avoided.

Figure 4:
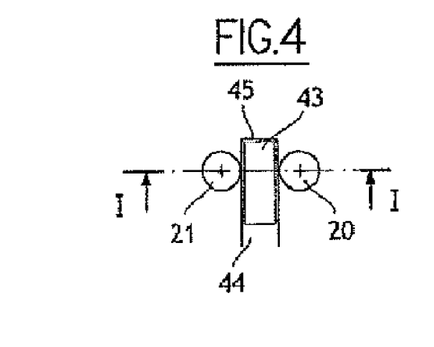
FIG. 4 shows a partial view of the ignition device as a sectional view through the transverse plane IV-IV in FIG. 1.

According to a first embodiment, illustrated in FIGS. 1, 2 and 4, the electric resistor 40 comprises an insulating body 43 used as a support for carbon fibers 44. The carbon fibers 44 are formed as a wick forming a U partly surrounding the body 43 so as to be flattened against its side surfaces, as this will be seen in detail later on.

As a non-limiting example, the body 43 is in an elastically compressible material and preferably made by cutting it out in a molten or extruded part with suitable thickness, such as a full silicone sheet.

As regards the carbon fibers 44, a strip of unidirectional carbon fibers with a diameter of the order of a few micrometers (for example 4 μm) may be used, the number of fibers in the fiber packet being typically from a few hundred to a few thousand.

According to a preferred embodiment, the body 43 is a rectangular profile, the width of which is slightly larger than the width of the space between the electrodes 21, 22. It may comprise a notch 45 with e.g. a semi-circular section on a front surface (see FIG. 2), a notch in which the fibers 44 are retained at the transition between the two branches of the U.

Mounting the resistor on the electrodes is accomplished by force-fitting between the electrodes 21, 22, manually or with an automated equipment, the body 43 provided with carbon fibers 44, positioned as a U as described, from the transition region between the branches of the U (i.e. from left to right in FIG. 2).

The elastic compressibility of the body 43 is such that during this insertion, the fibers 44 are retained by pressure on either side of the body, between both of its side surfaces and both electrodes 21, 22 respectively, while being oriented substantially perpendicularly to the electrodes.

The insertion of the intermediate body 43 between both electrodes 21, 22 may be carried out:
  either by starting with the free end of the electrodes 21, 22 and sliding along the latter right up to the desired position, in which the packet of fibers 44 is in contact with the electrodes over the whole of its height.
  or via the side of the electrodes, perpendicularly to the plane which they form, from the front face of the body in which the notch 45 is formed in order to ensure proper placement of the fibers 44.

In both cases, with the notch 45, the retention of the fibers 44 in place may be facilitated during the placement of the body 43 provided with the latter fibers between the electrodes.

Retaining in place the body 43 provided with the fibers 44 between the electrodes, with the required firmness, is ensured by the elasticity of the body, and if necessary, by that of the electrodes 21, 22 which may during the placement move slightly away from each other by elastic deformation inducing a return force.

Alternatively, in order to reinforce the physical contact between the fibers 44 and the electrodes 21, 22, it is possible to exert on the electrodes 21, 22 a force tending to bring them closer together with pliers. Ensuring or reinforcing the contact by means of an adhesive tape laid out so as to allow penetration of air right up to the resistor may also be contemplated.

With view to mass production of the device, in order to produce the resistors, a profile of great length may be used, for example extruded in the insulating material of the support 43, and over the length of which carbon fibers 44 are folded as a U. During the assembly, the profile is then severed to the proper width, parallel to the fibers, in order to obtain a resistor 40 of the type described above, set into place as also described.

It will be noted that according to an alternative embodiment, the carbon fibers 44 may be wound all around the body 43.

Figure 5:
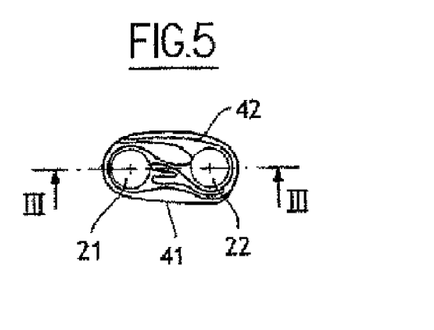

According to a second embodiment, illustrated in FIGS. 3 and 5, the resistor 40 comprises carbon fibers 44 adhesively bonded against the electrodes by means of an insulating support consisting of adhesive tape 42, for example in PTFE (Teflon®), wound around the electrodes.

In order to ensure firm application of the carbon fibers 44 against the electrodes 20 and 21, it is then for example possible to tighten the adhesive tape 42 by means of iron wire 41, as illustrated in FIG. 3, or by means of any other essentially rigid external structure. In all the cases, this rigid structure is selected to be in a material which neither contaminates the aluminothermic composition 4 nor the aluminothermic charge 2 if it were to decompose.

The adhesive tape 42 is positioned in such a way that the contact between the carbon fibers 44 and the electrodes 21 and 22 is as substantial as possible. For this purpose, it may for example be pushed back so that it forms an accordion between both electrodes 20 and 21 and at least partly fills the space between the latter, as illustrated in FIG. 5. Such a layout further allows the surrounding air to reach the resistor 40.

According to a third embodiment (not illustrated), the resistor 40 is a preformed carbon capsule unit which will be fitted onto the electrodes 20 and 21 by elastically deforming the capsule and/or the electrodes.

The deformation of the capsule 40 and/or the electrodes 20 and 21 is such that it is sufficient for ensuring application of the carbon against the electrodes by pressure, required for properly operating the device 1. In this embodiment, it is ensured that the air may flow right up to the resistor and accessorily, any infiltration of particles from the aluminothermic composition 4 into the inside of the resistor is prevented.

Moreover, in the case when the level of the aluminothermic composition would be located above the lower end of the electrodes 21, 22, the layout and the shape of the resistor in the two embodiments described earlier, allow it to be used as a barrier-forming element, in order to protect the electrodes 21, 22 from risks of melting and of being short-circuited with the composition.

According to a fourth embodiment (not illustrated), the electric resistor 40 is made by means of carbon fiber fabric. In this case, in order to ensure firm physical contact between the electrodes 20 and 21 and the resistor 40, provision may be made for conforming the carbon fabric around a body of the type of the one of the first embodiment, so that it adopts a U-shaped section, or for applying it by pressure against the electrodes 20 and 21 by means of an essentially rigid external structure, as in the second embodiment.

The device of the present invention operates in the following way. When it is connected to the power source, a current flows into the resistor 40 and in particular into the carbon fibers 44. The resulting Joule effect causes a rapid rise in the temperature of the fibers, until a temperature is reached such that the surrounding oxygen combines with the carbon of the resistor in order to form carbon monoxide.

The latter is then transformed by an exothermic reaction into carbon dioxide. The exothermic character of this reaction rapidly leads to the formation of a flame within the ignition charge 4, the temperature of which a flame may be estimated to be above 2,000° C., which triggers off the aluminothermic reaction of the latter.

With ignition of the charge 4, it is possible to rapidly attain the melting temperature of the material of the casing 6. The incandescent molten iron from the aluminothermic reaction of the charge 4 may then escape.

Figure 6:
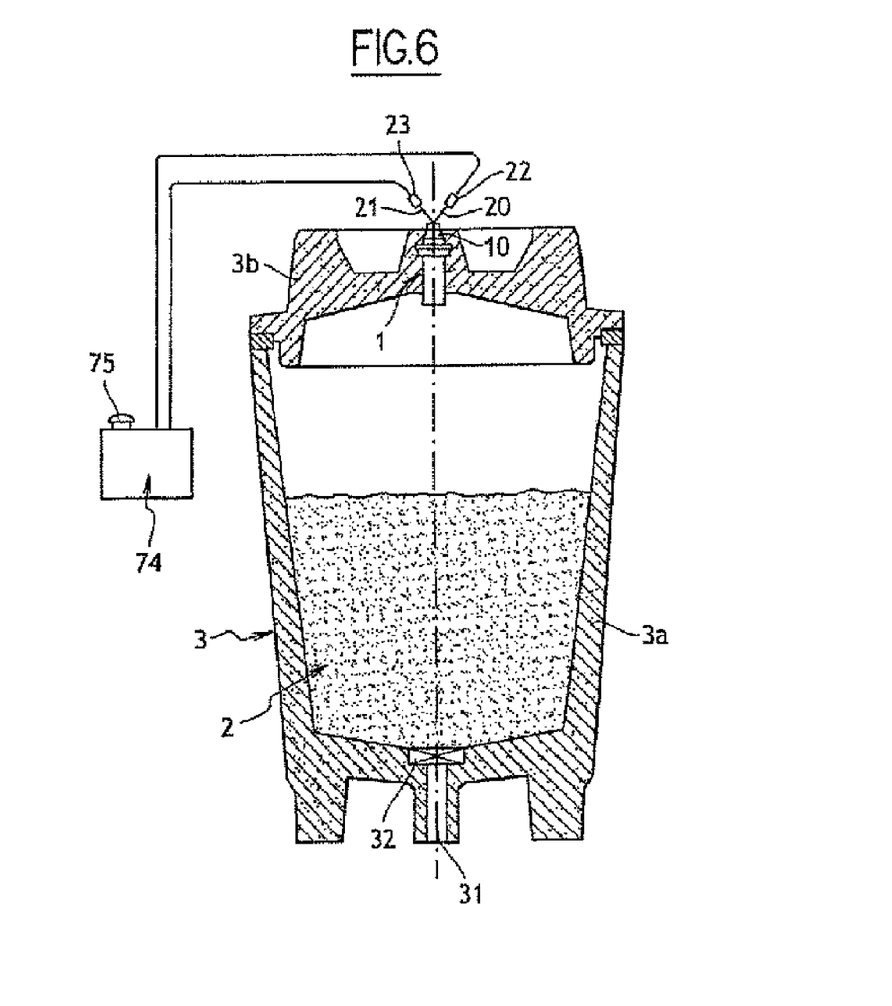
FIG. 6 illustrates a non-limiting example of an implantation embodiment of a device according to FIGS. 1 and 2 in a crucible assembly of the type used for aluminothermic welding of railway rails, as a section view through a longitudinal plane of symmetry including the longitudinal axis of the device according to the invention.

FIG. 6 illustrates a crucible assembly 3 provided with an ignition device according to the present invention and with a power source 74 provided with a control switch.

In a known way per se, the crucible assembly comprises a crucible portion 3a housing a main aluminothermic charge 2 and a lid 3b closing the crucible in the upper portion, both of these elements being preferably made in agglomerated sand. These elements perfectly known to one skilled in the art will not be described any longer. This crucible assembly is typically placed below a mold placed around two rail ends facing each other, in order to weld them by means of the molten steel from the aluminothermic reaction in the main charge 2, which will flow through an outlet orifice 31 after a plug 32 typically in cardboard has been consumed.

The device 1 is fitted into a throughgoing aperture made in the centre of the lid 3b, so that the casing 6 opens out into the inner space of the crucible vertically above the charge 3, and that the ends 22 and 23 of the electrodes 20 and 21 are accessible above the lid.

Flexible conductors (not referenced) may thus connect the power source 74 to the ignition device.

It is understood that when the ignition device is turned on incandescent molten iron flows downwards and reaches the main aluminothermic charge 2, which causes ignition of the latter in the attained area and then rapidly its propagation to the whole of the charge 2.

As soon as the ignition of the aluminothermic charge 2 has been ascertained, the electric current supply of the device 1 may be cut off.

The flexible conductors will be detached from the ends 22 and 23 of the electrodes before discarding the crucible and its lid (case of a single-use crucible).

According to an alternative embodiment, an ignition device 1 may be put into direct contact with the charge 2, in which case it is advantageously simplified into an ignition head including neither the casing 6, nor the priming aluminothermic charge 4 as described above. Such an ignition head is illustrated in FIG. 7a.

Figure 7A:
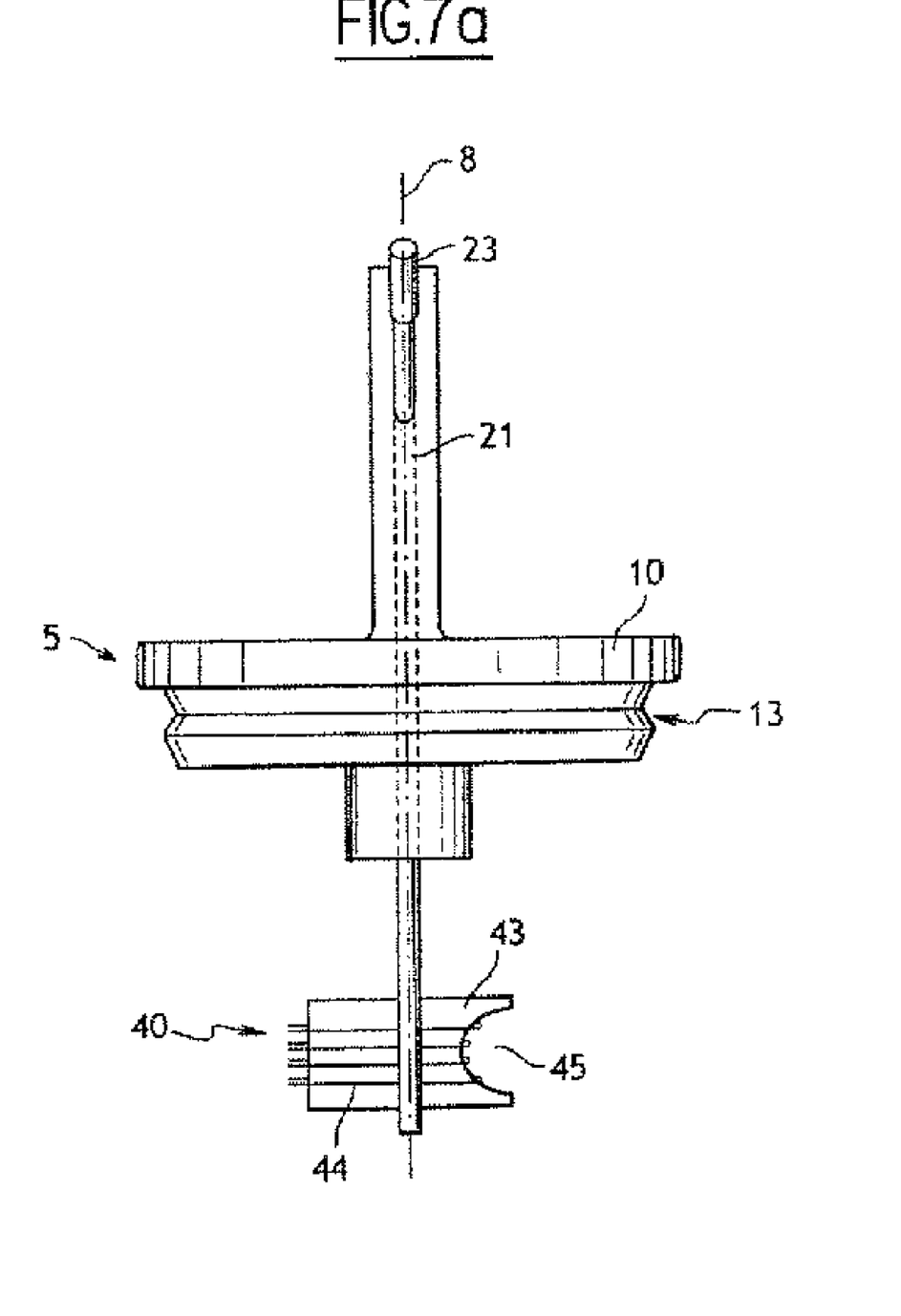
FIGS. 7a and 7b illustrate another ignition device according to the invention, as a view similar to FIG. 1, according to the same embodiment.
Figure 7B:
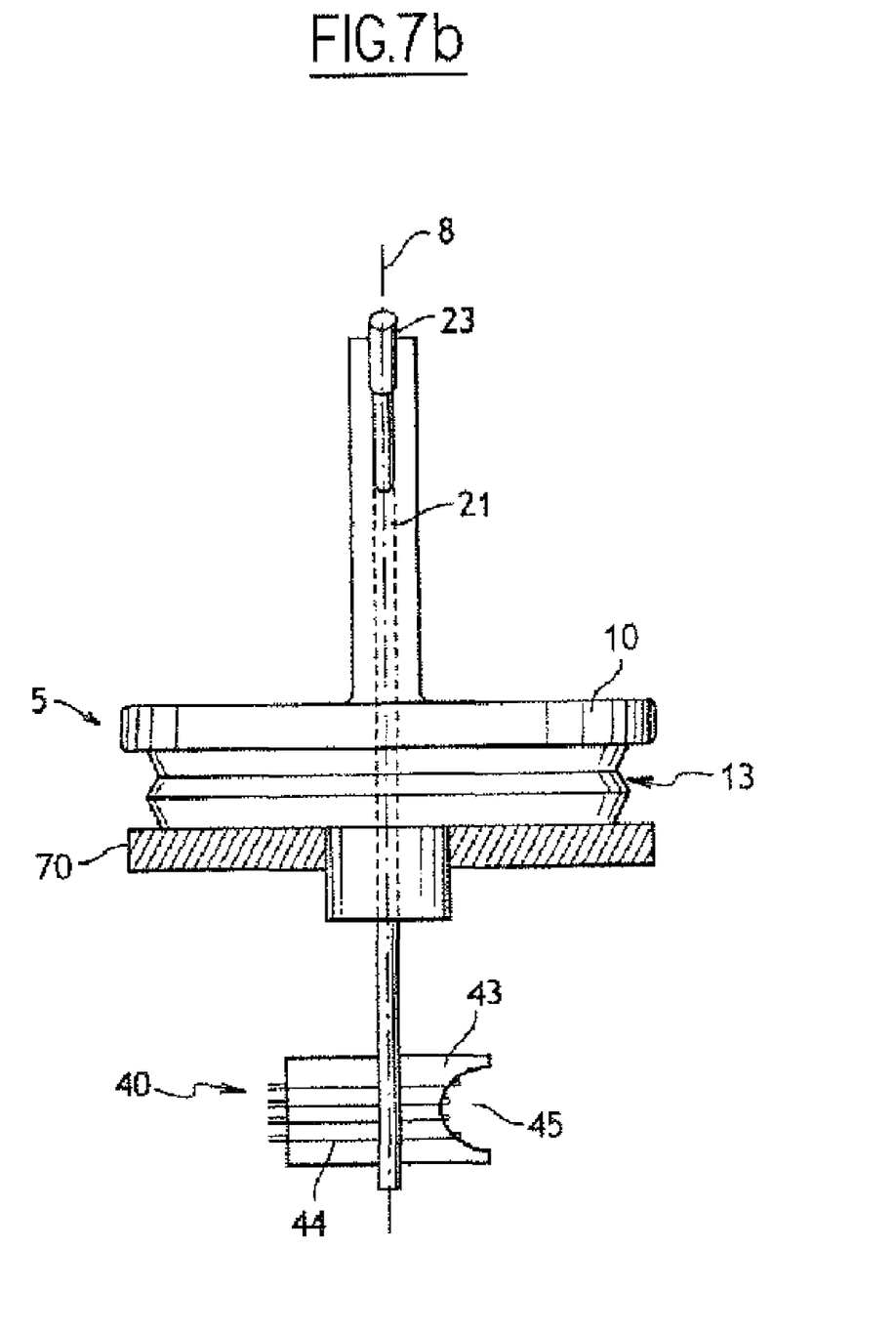

According to an alternative of this simplified device, as illustrated in FIG. 7b, a means is provided on the head for checking its burial depth from the free surface of the charge 2, or even for limiting this burial depth.

Such a means may comprise a flat washer 70 attached to the lower portion of the base 10.

In FIGS. 7a and 7b, elements which are identical or similar to those of FIGS. 1 to 5, are designated with the same reference marks.

It is understood that in the case of contact of the head 5 with the main charge 2, it is the flame generated at the resistor 40 as explained above, which directly causes the triggering-off of the aluminothermic reaction.

Figure 8:
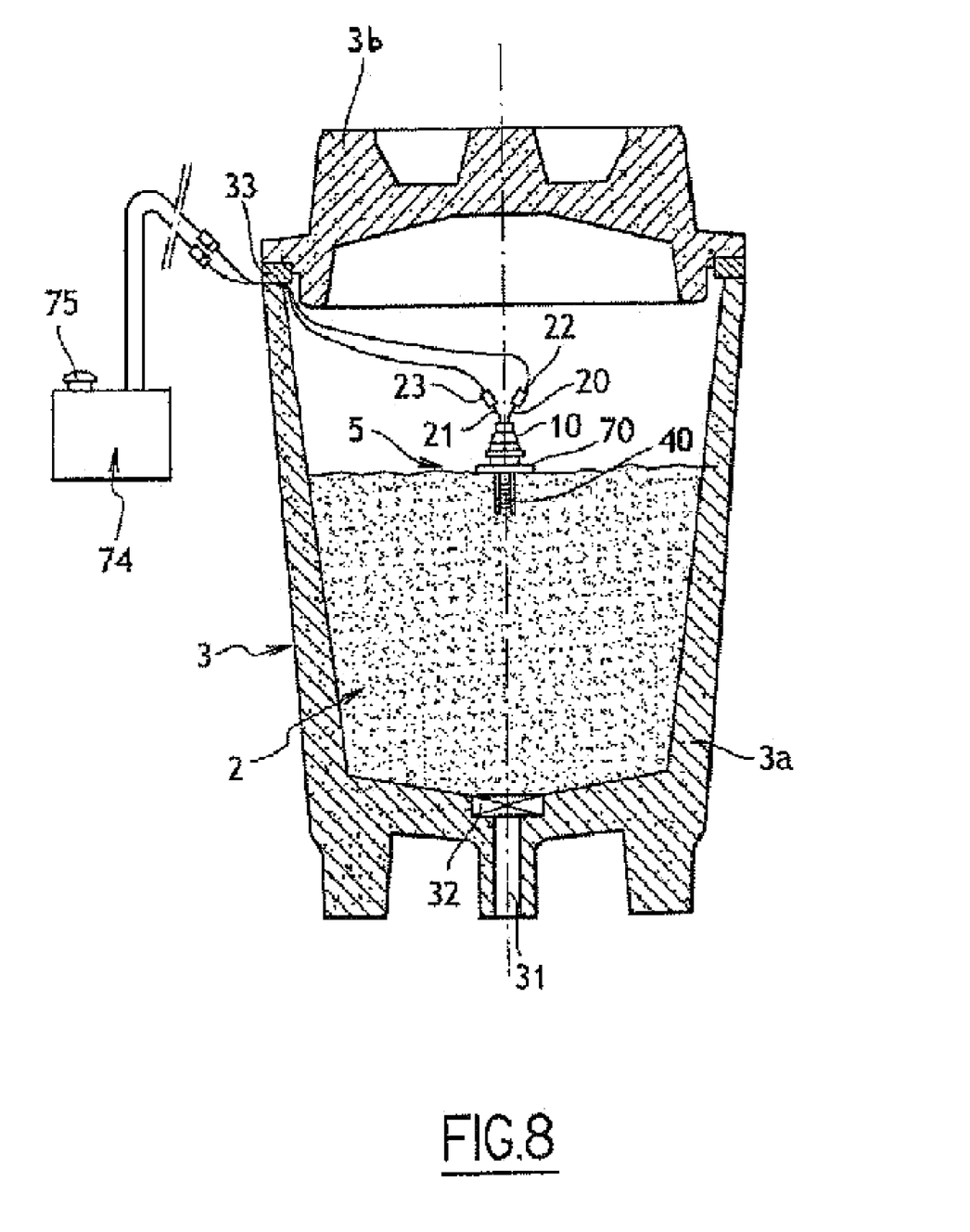
FIG. 8 shows a non-limiting example of an implantation embodiment of a device according to FIG. 7b in a crucible assembly of the type used for aluminothermic welding of railway rails, as a sectional view through a longitudinal plane of symmetry including the longitudinal axis of the device according to the invention.

The simplified device 1 may either be simply deposited on the surface of the charge 2, in a laid position, or preferentially, and as shown in FIG. 8, directly implanted in the aluminothermic charge 2. The end of the electrodes 21, 22 is then preferably protected by a barrier-forming element of the type described earlier (not shown), in order to avoid any risk of short-circuiting or melting the electrodes 21, 22.

The head 5 is held down flat, with the assistance of the washer 70, on the charge upper face 2, so that the electrodes 20 and 21 and the resistor 40 penetrate into the charge 2 over a certain depth. At the same time, this depth is reduced so as to allow ambient air in the crucible to flow right up to the resistor 40 upon ignition, so as to provide the required oxygen supply.

In this case, the conductors conducting the current to the head 5 preferably pass in the gap between the crucible portion 3a and the lid portion 3b, the felt gasket generally provided in this gap avoiding deterioration of these conductors.

Alternatively, provision may be made for inserting a head 5 as described above, or even a complete ignition device 1, into a side wall of the crucible portion 3a, either by direct incorporation during the manufacturing of the crucible, or by joint engagement, prior to carrying out welding and before placing into the crucible the aluminothermic charge into a housing laid out for this purpose in said wall during the manufacturing of the crucible.

Here again, the aluminothermic reaction begins as soon as the flame is generated at the resistor 40.

One skilled in the art will understand that the different embodiments of a device according to the invention which have been described above are only non-limiting examples, as well as the different modes of cooperation between such a device according to the invention and a main charge 2 to be ignited. The present invention is therefore capable of having many alternatives with respect to what has just been described, without these alternatives departing from the scope of the present invention.

The invention claimed is:

1. A device for igniting an aluminothermic composition, comprising an electric resistor connecting two electrodes and intended to be powered with an electric current source in order to cause release of heat via the Joule effect, said electric resistor being exposed to a medium comprising oxygen and carbon so that the rise in temperature of the medium by the resistor causes formation of carbon monoxide and then an exothermic reaction of the latter with oxygen, causing the occurrence of a flame capable of igniting the aluminothermic composition.

2. The device of claim 1, wherein the resistor comprises carbon.

3. The device of claim 2, wherein the formation of carbon monoxide is at least partly effected from the carbon comprised in the resistor.

4. The device of claim 3, wherein the resistor comprises an insulating support bearing carbon fibers.

5. The device of claim 4, wherein the support bears the carbon fibers around it and is forcibly inserted between the electrodes.

6. The device of claim 5, wherein
the support is elastically compressible.

7. The device of claim 1, wherein
the oxygen is from the ambient air.

8. The device of claim 1,
including a passage for providing ambient air.

9. The device of claim 8, wherein
the passage opens out in the vicinity of the resistor.

10. The device of claim 8, wherein the oxygen if from the ambient air and the passage is formed in a wall of the casing.

11. The device of claim 1, wherein an element forming a barrier to solids is provided around the resistor.

12. The device of claim 1, wherein the electrodes are in steel.

13. The device of claim 1, characterized in that the resistor is a preformed capsule.

14. The device of claim 1, including a sealed casing containing a priming aluminothermic composition dose and mounted on a base in which the electrodes are mounted.

15. The device of claim 14, wherein the casing is made in a material for which the melting point is substantially below the temperature reached by the aluminothermic reaction of the priming dose.

16. The device of claim 15, wherein the casing is made as a single piece in aluminium or aluminium alloy.

17. A method for igniting a main aluminothermic composition, comprising the steps consisting of placing in proximity to the composition, a device according to claim 14, and of supplying electric current to the resistor of this device, the flame generated at the resistor triggering off an aluminothermic reaction at the priming dose, itself followed by at least partial melting of the casing letting incandescent molten metal from said reaction propagate towards the main aluminothermic composition.

18. A method for igniting an aluminothermic composition, comprising the steps consisting of placing in proximity to the composition, a device according to claim 1, and of supplying electric current to the resistor of this device, the flame generated at the resistor directly triggering off the aluminothermic reaction.

19. A method for aluminothermic welding of profiles such as railway rails, in which an aluminothermic composition dose is placed in a crucible surmounting a mold defining with two profile ends facing each other, a molding cavity, characterized in that the aluminothermic reaction is triggered off in said dose by means of a method according to claim 18.

20. A crucible assembly for an aluminothermic reaction, capable of being adjusted above a mold for welding profiles such as railway rails, comprising an ignition device according to claim 1.

* * * * *